Figure 5:
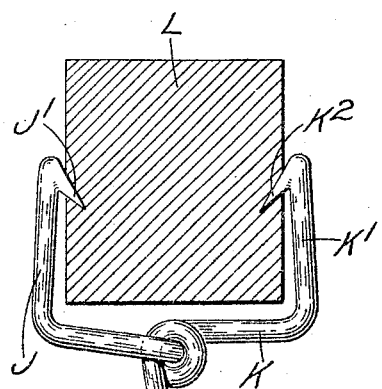

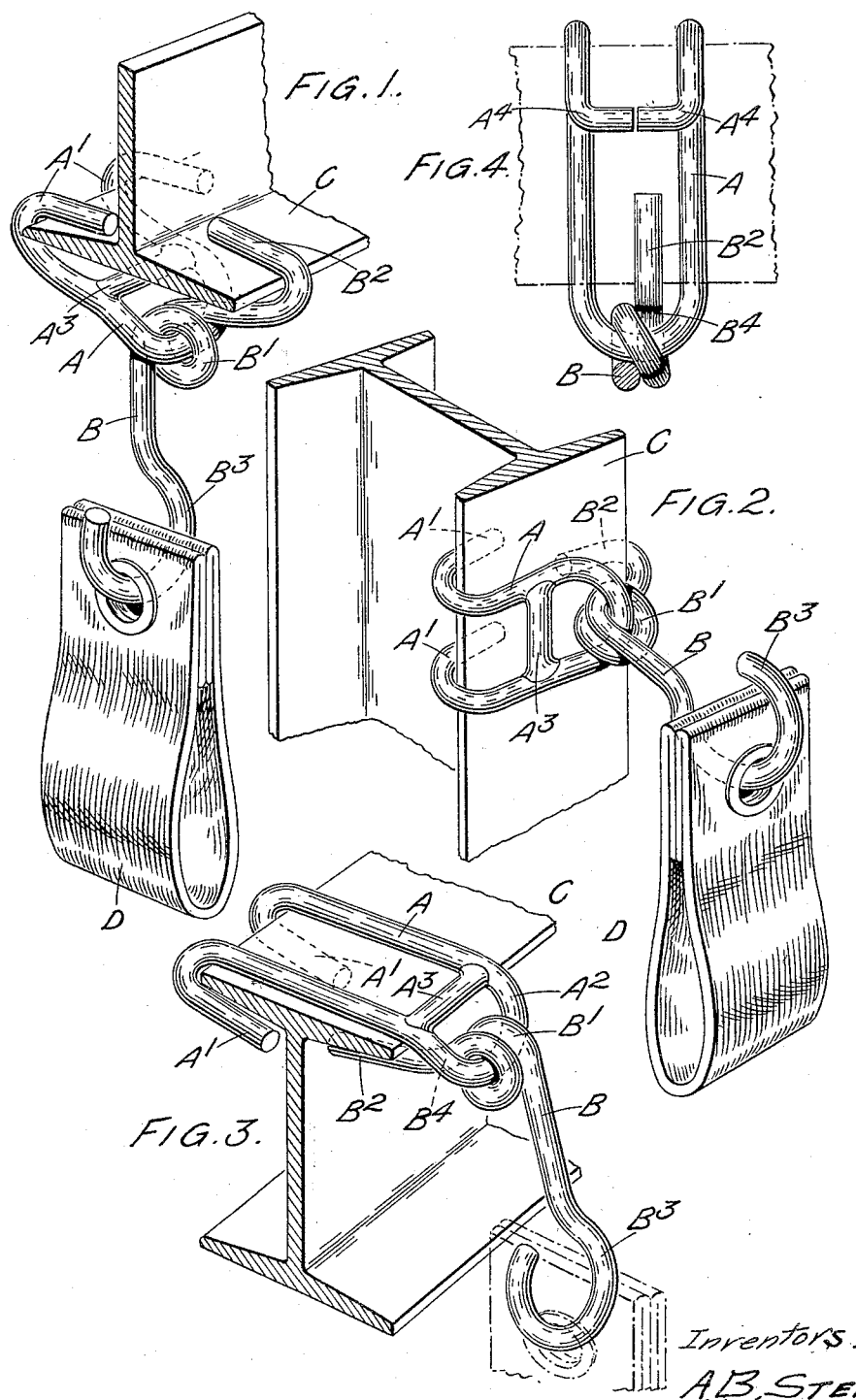

Jan. 17, 1933.  A. B. STEELE ET AL  1,894,895
DETACHABLE SUSPENSION OR GRIPPING DEVICE
Filed Nov. 30, 1931  2 Sheets-Sheet 2

Inventors.
A.B. STEELE
Per, ÷ J. LINES.
Blair Kilgour Attys

Patented Jan. 17, 1933

1,894,895

UNITED STATES PATENT OFFICE

ARTHUR BEEVOR STEELE, OF BELTINGE, HERNE BAY, AND JOHN LINES, OF BETTES-HANGER, NEAR DEAL, ENGLAND; SAID LINES ASSIGNOR TO SAID STEELE

DETACHABLE SUSPENSION OR GRIPPING DEVICE

Application filed November 30, 1931, Serial No. 578,160, and in Great Britain December 9, 1930.

This invention relates to self-locking detachable suspension or holding devices adapted to grip a steel joist, beam, girder, stanchion or the like so that by means of a suspension member attached thereto an article may be suspended from or anchored to the beam or a beam, joist, girder, rail or the like may be lifted by the suspension device.

The object of the invention is to provide a device which will be simple in construction, effective in operation and inexpensive to produce.

To this end a self-locking detachable suspension device according to the present invention comprises a first holding member one end of which is adapted to engage one side of a beam-like support while its other end has a part adapted to act as a pivot pin, a combined holding and suspension arm formed from metal bar, the ends of which constitute respectively a second holding member and a suspension member, a part of the metal bar intermediate in its length being coiled around the part of the first holding member which constitutes the pivot pin and forming a pivotal joint therewith to allow the free ends of the two holding members to be separated and applied to a beam-like support at any point in its length and to be brought together to grip said support between them, and load-carrying means at the free end of the suspension arm, the load being transmitted by the said arm to both holding members and acting to draw them together and maintain them in their operative gripping position.

In one convenient arrangement that holding member which is pivoted to the combined holding and suspension member is U-shaped in form and has the ends of its arms shaped to constitute hooks or spikes the intermediate part of the bar constituting the combined holding and suspension member being coiled around that part of the first holding member which connects the arms of the U and thus constitutes a pivot member.

The invention may be carried into practice in various ways and the devices made for example from bent metal rod, bent metal plate, metal stampings, castings, or forgings or otherwise but a number of constructions according to the invention are illustrated by way of example in the accompanying drawings, in which Figure 1 is a perspective view of one form of holding device according to this invention applicable to the horizontal lower flange of a girder or beam, Figure 2 illustrates the manner in which the device shown in Figure 1 may be applied to the flange of a vertical girder or stanchion, Figure 3 shows an alternative form of device according to this invention applicable to the upper flange of a horizontal girder or beam, Figure 4 illustrates a modification of the device shown in Figure 3, Figure 5 shows an alternative form applicable to a wooden beam.

In the construction shown in Figures 1 and 2, the device comprises a U-shaped holding member A having linked to it a combined holding member and suspension hook B, both these members being conveniently formed of metal rod. The U-shaped holding member A has the extremities of its limbs bent over at $A^1$ to engage one edge of a flange C of a girder, while one end of the combined holding member and suspension hook B is similarly turned over at $B^2$ to engage the other edge of the flange. The member B is coiled intermediate of its ends at $B^1$ around the centre part of the U-shaped member A to form a pivot connection therewith underneath the flange, and thereafter continues downwardly, being formed at its lower end into a hook-like suspension member $B^3$ from which may be suspended the article to be carried. In the example shown a sling D of webbing or the like is suspended from the member $B^3$, this sling being adapted to carry an electric cable or a pipe.

The U-shaped holding member A is provided with a short cross-piece $A^3$ joining its parallel limbs, the purpose of this being to increase the rigidity of the holding member and prevent the combined suspension and holding member B from being displaced unduly along either arm of the U.

In an alternative construction (not shown)

the member B is passed several times around the centre of the U to form a helical collar thereon. This latter construction will likewise prevent relative displacement between the two holding members, and the cross-piece $A^3$ may then be dispensed with.

The bent-over end $B^2$ of the combined holding and suspension member may be appreciably flattened at its extremity so as to provide a larger area of contact between it and the flange upon which it rests, this modification tending to prevent lateral rocking or similar movement of the member B with respect to the flange, the ends $A^1$ of the member A which engage the girder flange being also similarly flattened if desired.

In the modified form of the device shown in Figure 3 for fitting to the horizontal flange of a girder, the construction is similar to that shown in Figures 1 and 2 except that, as will be seen, the parallel limbs of the U-shaped holding member are sufficiently lengthened to enable the pivotal part $B^1$ to clear the edge of the flange C, while the end $B^2$ of the combined suspension and holding member B which engages the flange need not be of hooked form as its function in this case is merely to press upwardly against the under side of the flange. The part $A^2$ of the member A is, however, conveniently bent slightly in the same direction as the hooks $A^1$ while the member B is also provided with a kink as shown at $B^4$, thus enabling the part $B^2$ to lie in contact with the girder-flange substantially throughout the length of such part.

It is usually desirable that the two component parts of devices according to this invention, namely the U-shaped holding member A and the combined holding and suspension member B, should not be liable to become detached from one another at any time. In the forms shown in Figures 1, 2 and 3, this is prevented by the cross-piece $A^3$, or by passing the member B several times around the centre of the U-shaped member A as described above. The same object may also be attained, however, as shown in Figure 4, by omitting the cross-piece $A^3$ and bending one or both of the extremities of the arms of the U-shaped member A inwards at $A^4$ to meet each other. If this is done the U-shaped member will then become in effect a closed ring, and it will be apparent that the two parts cannot then become detached from one another.

In the construction shown in Figure 5, the device comprises a holding member J which may be of U-shaped form generally similar to the form of the member A shown in Figures 1 and 2, the ends of the arms of this member, however, being formed as spikes $J^1$. Pivoted to the centre of this U-shaped member J is a combined holding and suspension member K the form of which is generally similar to that of the member B in Figures 1 and 2 except that the end of the holding member $K^1$ is formed as a spike $K^2$, the spikes $J^1$ and $K^2$ being adapted to be drawn into engagement with and dig into the sides of a wooden beam L when a load is placed on the suspension hook $K^3$ at the lower end of the member K.

In the construction shown in Figure 5, the device comprises a holding member J which may be of U-shaped form generally similar to the form of the member A shown in Figures 1 and 2, the ends of the arms of this member, however, being formed as spikes $J^1$. Pivoted to the centre of this U-shaped member J is a combined holding and suspension member K the form of which is generally similar to that of the member B in Figures 1 and 2 except that the end of the holding member $K^1$ is formed as a spike $K^2$, the spikes $J^1$ and $K^2$ being adapted to be drawn into engagement with and dig into the sides of a wooden beam L when a load is placed on the suspension hook $K^3$ at the lower end of the member K.

It is to be understood that the constructions illustrated are given by way of example only and that modifications may be made without departing from this invention. For example, the span of the device may be made adjustable to suit flanges of different width. This may be done by making the parallel limbs of the U-shaped holding member in the construction shown in Figures 1, 2, 3 and 4 extensible in some convenient manner, for example by incorporating a turn-buckle construction in each of them. Such construction may also be applied to the portion of the combined holding and suspension member lying between the coiled part $B^1$ and the inturned extremity $B^2$.

A turn-buckle may likewise be inserted in the suspension member B between the pivot $B^1$ and the hook $B^3$, whereby the effective length of the hook $B^3$ may be varied, and the hook may be so connected to the member B, as by a swivel joint, that the article suspended therefrom may be rotated if required.

Again, the ends of the holding members may be formed otherwise than as shown, according to the purpose for which they are intended and the structure which they are to grip, and other details of construction varied without departing from the scope of the present invention.

What we claim as our invention and desire to secure by Letters Patent is:—

1. A self-locking detachable suspension device comprising in combination a U-shaped metal bar constituting a first holding member, hooks at the free ends of the arms of the U, a second metal bar whose ends constitute respectively a second holding member and a suspension arm, a part of said second metal bar intermediate in its length being loosely coiled around that part of the first holding member which joins the arms of the U, forming a pivotal joint therewith to allow the free ends of the two holding members to be separated and applied to a beam-like support at any point in its length regardless of its position and to be brought together to grip said support between them, and load-carrying means at the free end of said suspension arm, the load being transmitted by said arm to both holding members and acting to draw them together and maintain them in their operative gripping position.

2. A self-locking detachable suspension device comprising in combination a U-shaped metal bar constituting a first holding member, a second metal bar whose ends constitute respectively a second holding member and a suspension arm, a part of said second metal bar intermediate in its length being coiled around that part of the first holding member which joins the arms of the U, forming a pivotal joint therewith to allow the free ends of said holding members to be separated and applied to a beam-like support at any point in its length regardless of its position and to be brought together to grip said support between them, hooks at the free ends of both holding members, and load-carrying means at the free end of said suspension arm, the load being transmitted by said arm to both holding members and acting to draw them together and maintain them in their operative gripping position.

3. A self-locking detachable suspension device comprising in combination a U-shaped metal bar constituting a first holding member, hooks at the free ends of the U, a second metal bar whose ends constitute respectively a second holding member and a suspension arm, a part of said second metal bar intermediate in its length being coiled around that part of the first holding member which joins the arms of the U, forming a pivotal joint therewith to allow the free ends of said holding members to be separated and applied to a beam-like support at any point in its length and to be brought together to grip said support between them, a member extending transversely between the arms of the U, and load-carrying means at the free end of said suspension arm, the load being transmitted by said arm to both holding members and acting to draw them together and maintain them in their operative gripping position.

4. A self-locking detachable suspension device comprising in combination a U-shaped metal bar constituting a first holding member, hooks at the free ends of the arms of the U, a second metal bar whose ends constitute respectively a second holding member and a suspension arm, a part of said second metal bar intermediate in its length being coiled around that part of the first holding member which joins the arms of the U, forming a pivotal joint therewith to allow the free ends of said holding members to be separated and applied to a beam-like support at any point in its length and to be brought together to grip said support between them, the free ends of the hooks on the U extending towards and lying adjacent one another so as to prevent said holding members from becoming detached from one another, and load-carrying means at the free end of said suspension arm, the load being transmitted by said arm to both holding members and acting to draw them together and maintain them in their operative gripping position.

In testimony whereof we have signed our names to this specification.

ARTHUR BEEVOR STEELE.
JOHN LINES.